March 13, 1928. 1,662,416
E. L. CLAUS
OVEN HEAT REGULATOR
Filed Oct. 14, 1926 2 Sheets-Sheet 1
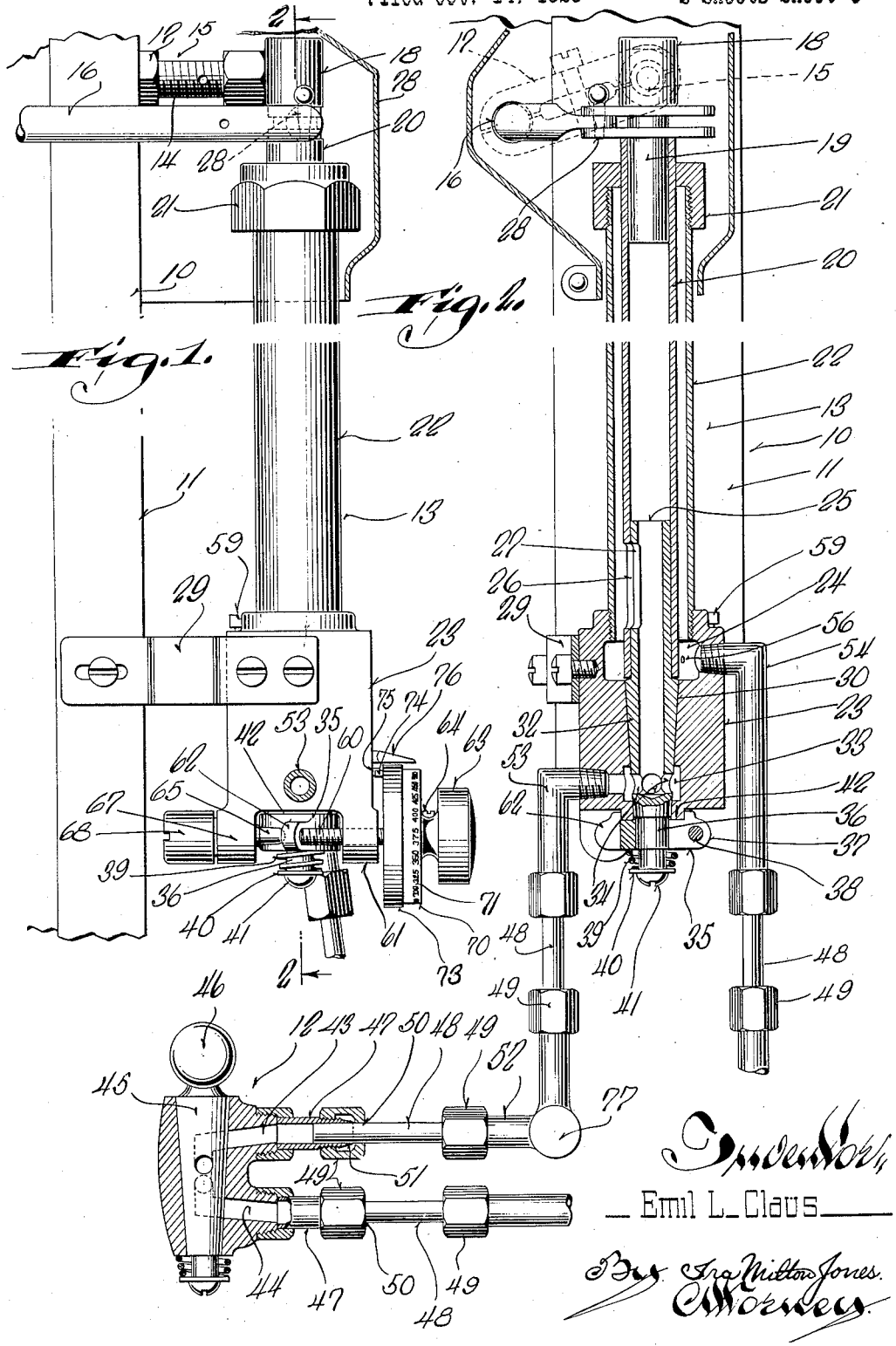

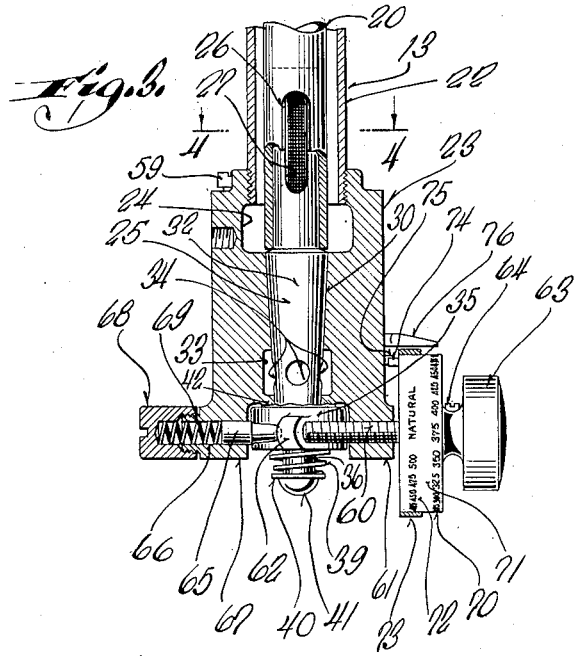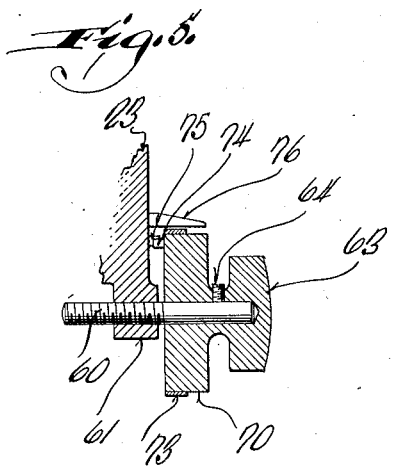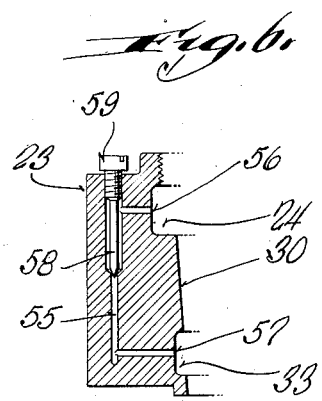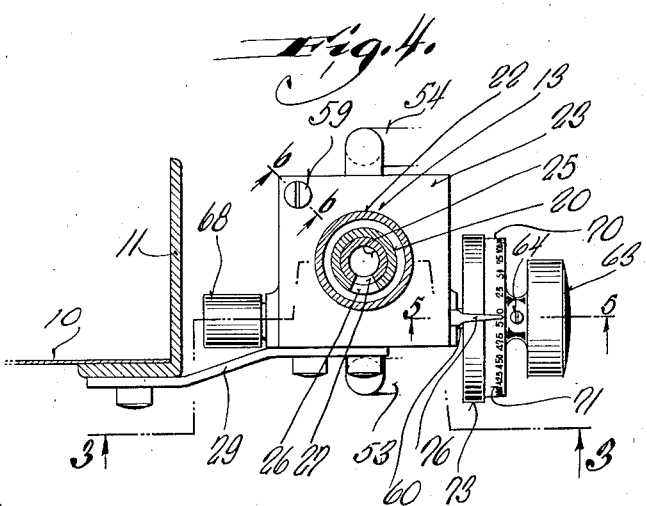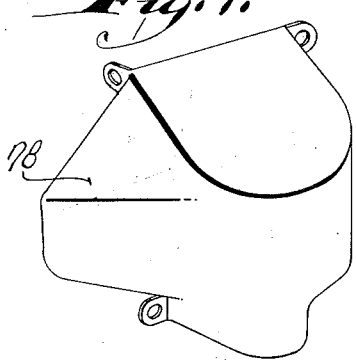

Patented Mar. 13, 1928.

1,662,416

UNITED STATES PATENT OFFICE.

EMIL L. CLAUS, OF MILWAUKEE, WISCONSIN, ASSIGNOR TO CLAUS MANUFACTURING CO., OF MILWAUKEE, WISCONSIN, A CORPORATION OF WISCONSIN.

OVEN-HEAT REGULATOR.

Original application filed November 10, 1923, Serial No. 673,953. Divided and this application filed October 14, 1926. Serial No. 141,542.

This invention relates to certain new and useful improvements in oven heat regulators capable of use on kitchen stoves, ranges and any other device where it is desired to maintain a predetermined degree of heat in a compartment such as an oven or other compartment.

Numerous types of oven heat regulators have been designed, and while they apparently function to some degree of certainty and accuracy, they are objectionable from the stove manufacturer's standpoint in that they require special fittings and pipings and are so arranged that the oven burner fuel valve is subject to the influence of the oven heat rendering it unreliable at times due to sticking of the parts.

Having the above and other objectionable features in mind, it is an object of this invention to provide an oven heat regulator so constructed and designed as to eliminate the necessity of special pipings and fittings and one in which the oven burner fuel valve is located without the influence of the oven heat and which is so designed as to offer no resistance of the functioning of the thermostatic element.

A further objection to the oven heat regulators now on the market is that the gas has contact with the oven, opening the instrument to serious objections on the part of stove manufacturers, and the fire underwriters, and this invention has for another object to provide an oven heat regulator in which the gas is absolutely disconnected from the oven to insure an increased factor of safety in the operation thereof and eliminate the necessity of snug fittings such as are necessary with the other devices in order to reduce the possibility of gas entering the oven.

Another objectionable feature of the thermostatic device now on the market is that when springs are utilized to operate the valve against a thermostatic member, the spring crystalizes after continuous use and loses its strength throwing the instrument out as far as accuracy is concerned, and furthermore, the spring being readily affected by heat soon loses its efficiency when within the range of the oven heat.

Having this objection to use with springs in thermostatic oven heat regulators in mind, this invention contemplates as another object the provision of an improved valve construction whereby springs are eliminated, and a positively actuated control valve provided to materially increase the efficiency and positiveness of operation of the instrument.

Another object of this invention resides in the provision of an improved valve construction including telescopic tube members actuated from a thermostatic member influenced by the oven temperature whereby the necessity of a snug, leak-proof fit between the valve members is eliminated and, consequently, the necessity of lubricating the members and the occurrence of sticking avoided.

Another object of this invention resides in the provision of a device of the character described wherein novel and improved means for adjusting the valve for various temperatures are provided.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of my improved control valve, the intermediate portion thereof being broken away and but a portion of the front frame being illustrated;

Figure 2 is a view, partly in elevation and partly in vertical section, taken through Figure 1 on the plane of the line 2—2;

Figure 3 is a view, partly in section and partly in elevation, of the lower portions of the valve and illustrating the manner of adjusting the same, said view being taken through Figure 4 on the plane of the line 3—3;

Figure 4 is a fragmentary view taken transversely through the valve on the plane of the line 4—4 of Figure 3;

Figure 5 is a fragmentary sectional view taken through Figure 4 on the plane of the line 5—5;

Figure 6 is a detailed sectional view illustrating the by-pass for insuring the maintainance of a minimum flame at the oven burner, said view being taken through Figure 4 on the plane of the line 6—6, and Figure 7 is a perspective view of the housing for the connection between the valve and thermostatic member.

Referring now more particularly to the accompanying drawings, in which like numerals designate like parts throughout the several views, 10 designates a heating oven provided with a front frame 11 having an opening, not shown, normally closed by a door, not shown. The frame 11 is of sturdy construction, being of cast iron, steel or the like and extends along the sides and bottom of the door opening and is suitably connected with the main framework, not shown, of the range proper. The oven is heated by a suitable burner, not shown, of any desired design and construction and is connected with the gas supply through a control cock 12 and the regulating valve, to be later described, of the thermostatic instrument 13.

The rigid framework 10 of the oven is of such construction as to have a minimum contraction and expansion under the ranges of temperature at which an ordinary oven operates and from this framework, my improved oven heat regulator is supported. The upper, inner corner of the framework has a small opening or aperture therein through which the outer end 14 of a tubular thermostatic member 15 is threaded, the rear end thereof passing through the oven rear wall, not shown, for connection with a member 16 having a relatively low coefficient of expansion through the medium of a clamping device 17. The forward end 14 of the thermostatic member is readily secured to the frame 11 by clamp nuts or the like 17' engaging the opposite sides thereof whereby the expansion and contraction of the member 15 under influence of temperature changes in the oven increases or decreases the distance between the frame 11 and the rear end of the thermostatic member.

A cap or bearing member 18 is threaded on the end 14 of the thermostatic member and mounts the upper end of a trunnion 19 closing the outer end of a sleeve member 20. The valve member 20 is preferably tubular and has its upper portion rotatably journaled in a cap 21 closing the upper end of a housing 22, the lower end of which is threaded in a base member 23 in register with a recess or chamber 24 therein. The lower end of the valve member 20 is disposed in the recess 24 and is rotatable over a normally stationary valve member 25 adjustably mounted in the base member, in the manner to be later described. The valve members 20 and 25 are provided with complementary ports or openings 26 and 27, respectively, adapted to align or disalign upon rotation of the member 20 through its connection with the member 16, as at 28, in the manner more explicitly described and illustrated in the application filed November 10, 1923, Serial No. 673,953, of which this is a division.

The base member 23 is firmly secured to the frame work 11 by a strap or bracket 29, see Figures 1 and 2, whereby the unit is readily secured in place by the cap member 18 and the bracket member. As will be readily obvious the member 15, having a high coefficient of expansion, contracts or expands as the oven temperature rises or falls, and this contraction or expansion is imparted to the valve member 20 through the member 16 having a relatively low coefficient of expansion which is connected with the crank of the valve member trunnion 19. As will be readily apparent, rotation of the valve member 20 aligns and disaligns the ports 26 and 27 to control the flow of fuel to the burner, not shown, in the manner now about to be described.

The member 23 is provided with a central bore or well 30 which is tapered to conform with the lower tapered portion 32 of the valve member 25, a recess or chamber 33 in the lower end of the member 23 surrounding the bore 30 in register with ports 34 in the valve 25. The valve 25 is secured in place by means of a clamp collar 35 fixed on the extended end 36 thereof and split, as at 37, and provided with a clamp bolt 38. The tapered portion of the valve member 25 is yieldably secured in the bore 30 when the collar 35 is loose on the extension 36 for the purpose of adjustment by an expansile spring 39 confined between a washer 40 secured to the extreme outer end of the valve member by a screw 41 and the collar member. The upper face of the collar member is preferably counter-bored to receive a circular boss or enlarged portion 42 on the under-face of the base member.

The gas cock 12 is of special construction, the gas flowing from the gas cock to the control valve hereinbefore described, through the gas cock again and into the manifold. This is accomplished by providing the gas cock with outlet and inlet ports 43 and 44, respectively, whereby movement of the gas plug 45 by its handle 46 to open position registers the port 43 with the stringer pipe or gas supply, not shown, and the port 44 with the burner, not shown. The outlet port 43 has a coupling tube 47 connected therewith in which one end of an extensible tube 48 is telescoped and adjustably secured by a cap or head 49 threaded from the end of the tube 47. The head or cap 49 has a part 50 adapted to ride over the outer tapered end 51 of the tube 47 to secure the tube 48 therein in adjusted position and prevent the leakage of gas therepast. The other end of the tube 48 is adjustably telescoped in one end of an L coupling 52 and secured thereto by a head 49 in a manner similar to that in which it is secured to a second adjusting unit embodying a tube 48 with a coupling 53 connected with the recess 33.

An L coupling 54 has one end connected with the recess 24 and its other end connected through a source of connections similar to that previously described with the port 44 so that with the ports 26 and 27 communicating and the gas cock plug 45 open gas will flow from the recess to the chamber 33 through the valve 25 into the interior of the casing 22 of the ports 26 and 27 upwardly through the connected coupling 54 which is connected therewith through the port 44 to the burner.

In the event the thermostatic member is expanded to the extent that the ports 26 and 27 are disaligned, a minimum flow of gas to the burners is maintained by gas flowing from the recess 33 to the recess 24 through a by-pass 55 communicating with said recesses at 57 and 56, respectively. A needle valve 58 having an adjusting screw 59 positioned exteriorly to the base member facilitates the regulation of the gas supply to the burner through the by-pass.

The valve member 25 is normally stationary, as stated above, and the valve member 20 rotates as the thermostatic member 15 contracts and expands and aligns and disaligns the ports 26 and 27, to maintain the volume of gas supplied the burner at a point sufficient to cause the same to maintain the oven temperature at any predetermined degree which may be set by adjusting the normally stationary valve member 25.

The valve member 25 is adjusted or rotated to any desired position of adjustment by a setting screw 60 threaded in a lug or ear 61 extended from the base 23 and having its inner end engageable with a projection or lug 62 extended from the collar member 35, said screw being provided with a knob or adjusting wheel 63 which is adjustably secured thereon by a set screw 64. The lug 62 is yieldably maintained in engagement with the inner end of the screw 60 by a spring pressed plunger 65 mounted in the bore 66 of a lug or ear 67 carried by the base member in axial alignment with the lug 61 and between the inner end of which a removable cap 68 and an expansile spring 69 is confined. The spring pressed plunger 65 in addition to maintaining the lug 70 and the screw 68 in engagement at all times, maintains all play or lost motion to one side and thus increases the accuracy of the instruments.

The knob 63 is adjustably secured to the screw shaft 60 by the screw 64 and a cylindrical dial or disk 70 is provided on its periphery with two sets of figures 71 and 72, see Figure 3, for artificial and natural gas, respectively, and to prevent confusion, a shield or ring member 73 is engaged over the set of figures not in use.

As is well-known in the art, natural gas has a higher B. t. u. than artificial gas, thus requiring a lower volume of gas to maintain a set degree of heat when natural gas is the fuel, and a larger volume when artificial gas is required. For this reason, the compound dial is employed and the shield or ring 73 utilized to block out or cover the artificial gas figures when natural gas is being used, and vice versa. As but one turn of the knob 63 is required to change the instrument from minimum to maximum heat, the stop 74 co-operates with a stop 75 carried by a face member to prevent rotation of the knob more than one turn.

Three means are provided for setting the instrument after the same has been applied to a stove, one, the connecting member 17 which is preferably in the form of an adjustable clamp, another, the collar member 35, and the other, the set screw 64. After the instrument has been applied to the oven, the burner, not shown, is ignited and after the oven has become heated, a thermometer reading is taken. Assuming the thermometer reading to be three hundred degrees, the connecting member 17 may be loosened and the knob 63 rotated to align the designation three hundred with a pointer 76 carried by the base member when the connecting member is again made fast; the binding screw 38 of the collar member 35 loosened and the knob 63 rotated to align the designation three hundred with the pointer 76 and the screw 38 then turned to make the collar member fast to the extended end portion 36 of the valve; or the set screw 64 loosened and the knob 63 rotated to align the designation three hundred with the pointer 76 when the set screw is tightened to make the knob 63 and its dial fast to the screw shaft 68. All of these adjustments are located exteriorly of the oven and out of the range of the oven heat and are made under atmospheric conditions rendering them absolutely accurate.

As an added factor of safety against extinction of the burner, a pilot light, not shown, is provided which preferably receives its source of fuel from the pipe connection leading from the valve port 43 to the chamber or recess 33, preferably at 77, as clearly described in the application of which this is a division.

The upper end of the valve structure proper and the outer end of the members 15 and 16 are preferably enclosed in a housing 78 the outermost portion of which has a flat inclined surface with respect to the perpendicular on which various figures are delineated representing the degree of heat and the practical uses to which such degrees are most commonly used in order to assist the operator in setting the device. As an example, should the operator desire to set the oven for baking bread, a glance at the top of the housing 78 discloses that four hundred degrees is the temperature required, and the knob 63 is rotated to align the four hundred degree designation on the dial 70 with the pointer 76.

With the oven thus set for four hundred degrees, the gas cock 12 is opened and the burner, not shown, ignited. The oven being practically cold and the member 15 fully contracted, the ports 26 and 27 are in full alignment and the burner is supplied with a maximum volume of gas. As the temperature of the oven approaches four hundred degrees, member 15 rotates the valve member 20 through the neutral member 16 gradually closing the ports 26 and 27, and diminishing the supply of fuel to the burner in proportion to the increase in the oven temperature.

This construction eliminates the use of springs against which a thermostatic member must work, as is required in the majority of thermostatic oven heat regulators now on the market, and also eliminates the valve member in which the force of gravity must be contended with. Furthermore, the gas is at all times exteriorily of the oven which is a safety factor in an instrument of this character.

From the foregoing description taken in connection with the accompanying drawings, it will be readily apparent to those skilled in the art to which an invention of this character appertains, that I provide an improved oven heat regulator which will offer a minimum of resistance to the operation of the valve by the thermostatic member and which will have a protection against fuel leakage.

What I claim as my invention is:

1. In an appliance of the character described, a base member, a normally stationary valve member adjustably mounted in the base member and having one end extended upwardly and its other end projected outwardly of the base member, a second valve member cooperating with the first valve member to govern the passage of fuel therepast, a collar member mounted on the projected end of the first valve member, a screw shaft engageable with the collar member and adapted, upon rotation, to adjust the first valve member, and dial means carried by the screw shaft to display the adjustment of said first valve member.

2. In an appliance of the character described, a base member, a normally stationary valve member adjustably mounted in the base member and having one end extended upwardly and its other end projected outwardly of the base member, a second valve member cooperating with the first-mentioned valve member, to govern the passage of fuel therepast, a collar member, means adjustably securing the collar member on the projected end of the first valve member, a screw shaft engageable with the collar member and adapted, upon rotation, to adjust the first valve member, and dial means carried by said screw shaft to display the adjustment of said first-mentioned valve member.

3. In an appliance of the character described, a base member, a normally stationary valve member adjustably mounted in the base member and having one end extended upwardly and its other end projected outwardly of the base member, a second valve member cooperating with the first valve member to govern the passage of fuel therepast, a collar member mounted on the projected end of the first valve member, a lateral projection on said collar member, a screw shaft, means yieldably retaining the collar member projection in engagement with the screw shaft whereby rotation of the shaft adjusts the first valve member, and means for indicating the adjustment of said screw shaft.

4. In an oven heat regulator, a thermally actuated valve comprising a pair of telescoped tubular valve members, one of said valve members being normally stationary, a temperature change sensitive member, means whereby contraction and expansion of said temperature change sensitive member moves the valve members with respect to each other, ports in the valve members adapted to register when the temperature change sensitive member is contracted, and means for adjusting the normally stationary member to regulate the degree of registration of the ports in the valve members.

5. In an oven heat regulator, a thermally actuated valve comprising a pair of telescoped tubular valve members, one of said valve members being normally stationary, a temperature change sensitive member, means whereby contraction and expansion of said temperature change sensitive member moves the valve members with respect to each other, ports in the valve members adapted to register when the temperature change sensitive member is contracted, an adjusting screw engageable with the normally stationary valve member, and means for operating the adjusting screw to move the normally stationary valve member and regulate the degree of registration of the valve member ports.

6. In an oven heat regulator, a thermally actuated valve comprising a pair of telescoped tubular valve members, one of said valve members being normally stationary, a temperature change sensitive member, means whereby contraction and expansion of the temperature change sensitive member moves the valve members with respect to each other, ports in the valve members adapted to register when the temperature change sensitive member is contracted, an adjusting member engageable with the normally stationary valve member, a regulating member fixed to the adjusting member for operating the same to adjust the degree of registration of the valve member ports, and means for adjusting said regulating member on the adjusting member.

7. In an oven heat regulator, a thermally actuated valve comprising a pair of telescoped tubular valve members, one of said valve members being normally stationary, a temperature change sensitive member, means whereby contraction and expansion of the temperature change sensitive member moves the valve members with respect to each other, ports in the valve members adapted to register when the temperature change sensitive member is contracted, an adjusting member engageable with said normally stationary valve member, a regulating member fixed to the adjusting member for operating the same to adjust the degree of registration of the valve member ports, delineations on the regulating member indicating degrees, and an indicator cooperating with said delineations whereby setting of the regulating member with a predetermined degree aligned with said indicator adjusts the normally stationary valve member so that the ports disalign when the temperature of said temperature change sensitive member reaches said degree.

8. In an appliance of the character described, a temperature change sensitive member, means rigidly mounting said member at one end, the other end thereof being free, a base member having a pair of chambers therein, a normally stationary tubular valve member having its bore in communication with one chamber, the upper end of the valve member projecting above the base member, a housing secured to the base member and enclosing the extended end of said valve member, the interior of the housing communicating with the other chamber, a second valve member movable over the extended end of the first valve member, ports in the valve members adapted, when registered, to provide a path for fuel from one chamber to the other through the housing and valve members, and means connecting the movable valve member with the sensitive member whereby contraction and expansion thereof aligns and disaligns the valve ports.

9. In an appliance of the character described, a temperature change sensitive member, means rigidly mounting said member at one end, the other end thereof being free, a base member having a pair of chambers therein, a normally stationary tubular valve member having its bore in communication with one chamber, the upper end of the valve member projecting above the base member, a housing secured to the base member and enclosing the extended end of the valve member, the interior of the housing communicating with the other chamber, a second valve member movable over the extended end of the first valve member, ports in the valve members adapted, when registered, to provide a path for fuel from one chamber to the other through the housing and valve members, a trunnion connected with the movable valve member and extended exteriorly of the housing, a crank arm fixed to said trunnion, and means connecting the free end of said temperature change sensitive member with said crank arm whereby expansion and contraction of said member rotates said movable valve member to align and disalign said valve ports.

10. In an appliance of the character described, a temperature change sensitive member, means rigidly mounting said member at one end, the other end thereof being free, a base member having a pair of chambers therein, a normally stationary tubular valve member having its bore in communication with one chamber, the upper end of the valve member projecting above the base member, a housing secured to the base member and enclosing the extended end of the valve member, the interior of the housing communicating with the other chamber, a second valve member movable over the extended end of the first valve member, ports in the valve members adapted, when registered, to provide a path for fuel from one chamber to the other through the housing and valve members, a trunnion connected with the movable valve member and extended exteriorly of the housing, a crank arm fixed to said trunnion, and adjustable means connecting the free end of said temperature change sensitive member with said crank arm whereby expansion and contraction of said member rotates said movable valve member to align and disalign said valve ports.

11. In an appliance of the character described, a temperature change sensitive member, means rigidly mounting said member at one end, the other end thereof being free, a base member having a pair of chambers therein, a normally stationary tubular valve member having the lower end portion of its bore in communication with one chamber, the upper end portion of the valve member projecting above the base member, a housing secured to the base member and enclosing the extended end of the valve member and having its interior in communication with the other chamber, a second valve member movable over the extended end of the first valve member, ports in said valve member adapted, when registered, to provide a path for fuel from one chamber to the other through the housing and valve members, a trunnion connected with the movable valve member and extended exteriorly of the housing, a crank arm fixed to said trunnion, means connecting the free end of said temperature change sensitive member with said crank arm whereby expansion and contraction of said member rotates the movable valve member to align and disalign said valve ports, and a bearing cap connected with the anchored end of the temperature change sensitive member and receiving said trunnion to mount the upper end of the instrument.

In testimony whereof I hereunto affix my signature.

EMIL L. CLAUS.